United States Patent [19]
Smith

[11] Patent Number: 5,954,526
[45] Date of Patent: Sep. 21, 1999

[54] PROCESS CONTROL TRANSMITTER WITH ELECTRICAL FEEDTHROUGH ASSEMBLY

[75] Inventor: Dennis J. Smith, Bloomington, Minn.

[73] Assignee: Rosemount Inc., Eden Prairie, Minn.

[21] Appl. No.: 08/725,745

[22] Filed: Oct. 4, 1996

[51] Int. Cl.⁶ .................................................. H01R 13/44
[52] U.S. Cl. .......................................... 439/136; 439/709
[58] Field of Search .................................... 439/136, 709, 439/621, 622; 340/638, 870.38

[56] References Cited

U.S. PATENT DOCUMENTS

| | | | |
|---|---|---|---|
| 3,068,442 | 12/1962 | Kubik et al. .............................. | 439/136 |
| 3,486,154 | 12/1969 | Seagrave et al. ........................ | 439/622 |
| 4,238,140 | 12/1980 | Cairns et al. ............................. | 439/621 |
| 5,554,809 | 9/1996 | Tobita et al. .............................. | 73/700 |

FOREIGN PATENT DOCUMENTS

| | | |
|---|---|---|
| 08043231 | 2/1996 | Japan . |
| WO 95/08758 | 3/1995 | WIPO . |

OTHER PUBLICATIONS

"Models 3144 and 3244MV Smart Temperature Transmitters", Rosemount Measurement, Jun. 1996.

Primary Examiner—Gary F. Paumen
Assistant Examiner—Tho D. Ta
Attorney, Agent, or Firm—Westman, Champlin & Kelly, P.A.

[57] ABSTRACT

An explosion proof electrical feedthrough assembly is provided in a process variable transmitter which has a sensor sensing a process variable and providing a sensor output signal indicative of the process variable. The transmitter also includes a processing circuit coupled to the sensor to receive the sensor output signal and provide a transmitter output signal based on the sensor output signal. The feedthrough assembly includes a terminal block which is coupled to the processing circuit and includes power supply terminal connectors and communication signal connectors. The communication signal connectors are arranged generally radially about the power supply terminal connectors.

22 Claims, 4 Drawing Sheets

PROCESS CONTROL TRANSMITTER WITH ELECTRICAL FEEDTHROUGH ASSEMBLY

BACKGROUND OF THE INVENTION

The present invention deals with a process control system. More specifically, the present invention deals with a terminal block in a process control transmitter.

Process control transmitters typically include a sensor for sensing a process variable, such as pressure, flow, or other process variables. The sensor provides a sensor output signal which is indicative of the process variable. Many such transmitters also typically include processing circuitry which receives the sensor output signal and corrects and linearizes it based on certain errors and non-linearities which may occur in the sensor output signal. The corrected signal is then provided to processing and transmitter electronics in the process control transmitter which transmits a signal indicative of the sensed process variable to a remote location, such as to a control room or a field mounted controller.

Such transmitters are often field mounted devices and, as such, require a variety of terminal connections to be made during installation. Such terminal connections often include connection to a communication loop (such as a 4–20 mA loop), and connection to a power supply for a total 4-wire connection.

Also, since such transmitters are often field mounted devices, they are exposed to large transient signals such as those induced by lightning strikes. In addition, they are often placed in hazardous environments and are thus required to meet certain intrinsic safety standards, explosion proof criteria and standards governing the size and spacing of terminal connectors.

Therefore, in process control transmitters, providing a terminal block which enables efficient installation of terminal connections, and which still meets intrinsic safety, explosion proof, and size and spacing standards, can pose significant problems.

In addition, in hazardous environments it is highly desirable to take measures which tend to inhibit the discharge of electricity which could cause a spark. Thus, it is often desirable to have some type of covering over the terminal connections which are used to connect the transmitter to the power supply. Such covers are provided in order to prevent the accidental contact of both terminal connections by a tool or other implement used by an installation or service person, which could induce a spark. Prior terminal blocks provided a variety of covers.

One prior cover is configured as a hinge or swinging type cover. The cover includes a strip of non-conductive material which extends over the power supply terminal connectors and which is pivotable about one end thereof. Thus, the cover can be swung or pivoted from a covering position in which it covers both power supply terminal connectors to an accessing position in which both power supply terminal connectors are exposed.

Another prior cover is configured to slide relative to the power supply terminal connectors. The cover is configured to slide from a covering position in which both supply terminal connectors were covered to an accessing position in which both power supply terminal connectors were exposed. However, both prior power supply terminal connector covers have significant drawbacks. First, both prior covers either cover both terminal connectors or expose both at the same time. Therefore, there is a possibility that the two terminal connectors can be shorted together to cause a spark. Further, both prior covers require significant additional space within the transmitter enclosure to move from the respective covering positions to the accessing positions. Such space is not often available but is usually quite limited in typical process control transmitter housings.

Also, typical transmitters may have fused circuits. Since the transmitters are often field mounted transmitters, they are typically located in areas that are very difficult to access by service and installation personnel. The areas containing the transmitters may not be well lit, and can also contain other structures which hinder access to the transmitters. Thus fuses in prior transmitters can be very difficult to change. Also, manipulating the connections to the transmitter can also be very difficult because of the impediments to access.

SUMMARY OF THE INVENTION

An explosion proof electrical feedthrough assembly is provided in a process variable transmitter which has a sensor sensing a process variable and providing a sensor output signal indicative of the process variable. The transmitter also includes a processing circuit coupled to the sensor to receive the sensor output signal and provide a transmitter output signal based on the sensor output signal. The feedthrough assembly includes a terminal block which is coupled to the processing circuit and includes power supply terminal connectors and communication signal connectors. The communication signal connectors are arranged generally radially about the power supply terminal connectors.

DETAILED DESCRIPTION OF THE PREFERRED EMBODIMENTS

Figure 1:
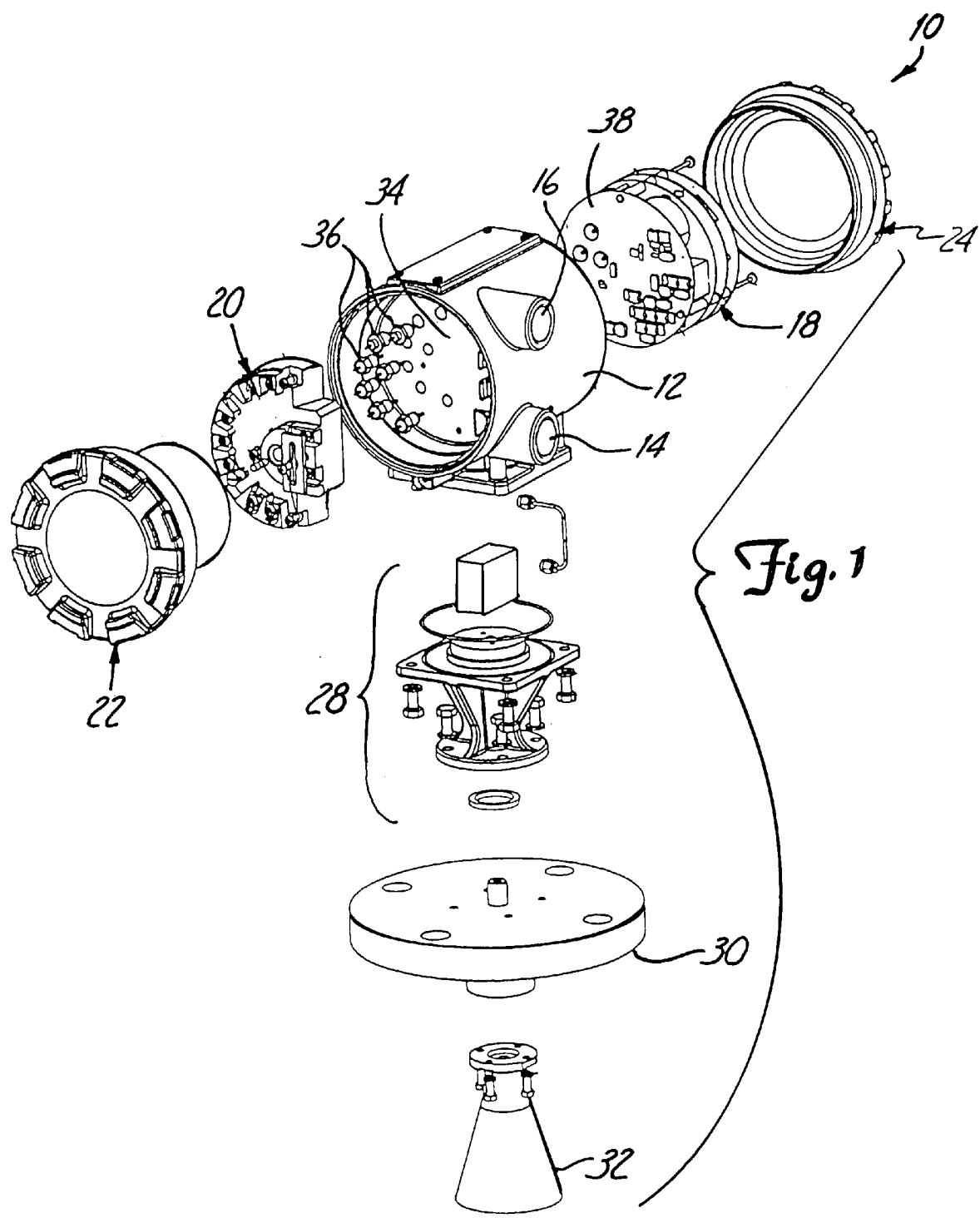
FIG. 1 is an exploded perspective view of a process control transmitter 10 according to the present invention.

FIG. 1 is an exploded perspective view of a process control transmitter 10 in accordance with the present invention. While the present invention could be implemented with any suitable process control transmitter, in the embodiment shown in FIG. 1, process control transmitter 10 is a radar level gauge which uses radar to sense the level of a fluid, or other medium, in a container and provide an output indicative of that level. Transmitter 10 includes transmitter housing 12 which has a plurality of conduits 14 and 16. Transmitter 10 also includes a stack of printed circuit boards 18, terminal block 20, covers 22 and 24, waveguide feed member 26, flange adaptor assembly 28, process mounting flange 30 and antenna 32. A dividing wall 34 divides housing 12 into two cavities, one of which contains circuit boards 18 and the other of which contains terminal block 20.

Terminal block 20 is mounted in transmitter housing 12 by a plurality of fasteners, such as screws, which are mounted through a corresponding plurality of through holes in terminal block 20 and which are screwed into dividing wall 34 in housing 12. Power and communication signals are coupled to transmitter 10, through the terminal connections on terminal block 20 by conductors which enter through conduits 14 and 16. The power and communication signals are provided from (and to), for example, a control room or another transmitter.

The signals are provided by terminal block 20 to printed circuit boards 18 by a plurality of pins 36 which make contact with corresponding sockets on the bottom side of terminal block 20, and which also pass through center wall 34 to make contact with corresponding sockets on the top printed circuit board 38 of stack 18. Pins 36, in the preferred embodiment, are provided with electromagnetic interference (EMI) or RFI filters, such as capacitors and inductor, which are built in to the connectors in a known fashion. Such a configuration, in part, may enhance the explosion proof characteristics of a feedthrough assembly for feeding signals through dividing wall 34.

In one preferred embodiment, terminal block 20 is made by first providing an injection molded potting shroud which substantially serves as a shell, with an inner cavity, that holds the remainder of the internal components of terminal block 20. The studs associated with each of the terminal block connectors are injection molded into the shroud. A fuse holder 58 (explained in greater detail with respect to FIG. 4) is then inserted through a hole in the shroud and a printed circuit board is then assembled into the cavity in the shroud and soldered at appropriate locations to form desired connections. The circuit board is populated with electronic components which are used in providing transient protection to protect from large signal transients which are induced such as through a lightning strike. Once the circuit board is assembled in the potting shroud, the shroud is filled with potting compound which is then cured. Of course, appropriate sockets are provided in the potting compound to allow for mateable connection with pins 36 so that signals from terminal block 20 can be transferred through the center wall 34 of transmitter 10. These assembly steps are performed substantially in accordance with known techniques.

Printed circuit boards 18 perform necessary signal processing and signal generation for the particular transmitter in which they are employed. In the embodiment shown in FIG. 1, printed circuit boards 18 provide signals which generate a microwave signal that is provided through coaxial microwave feed member 26 to flange adaptor assembly 28. Flange adaptor assembly 28 includes a waveguide which is coupled to receive the microwave signal from feed member 26 and provide it to process mounting flange 30. Process mounting flange 30, in turn, provides the microwave signal to antenna 32. Antenna 32 emits the microwave signal into the container for which the level is to be gauged. Antenna 32 also receives a reflected signal and provides that signal back through process mounting flange 30, flange adaptor assembly 28, microwave feed member 26, and to appropriate electronics on the printed circuit boards 18. Based on the emitted and reflected microwave signals, the level of the medium to be gauged can be determined.

Printed circuit boards 18 determine the level of the medium which is to be gauged based on the signals and provide a communication signal indicative of that level. The communication signal is provided back through pins 36 to terminal block 20. At terminal block 20, the communication signal is coupled to appropriate conductors and provided to a control room, a field mounted controller, another transmitter, or another suitable destination, through the conductors which exit one of conduits 14 or 16.

Figure 2A:
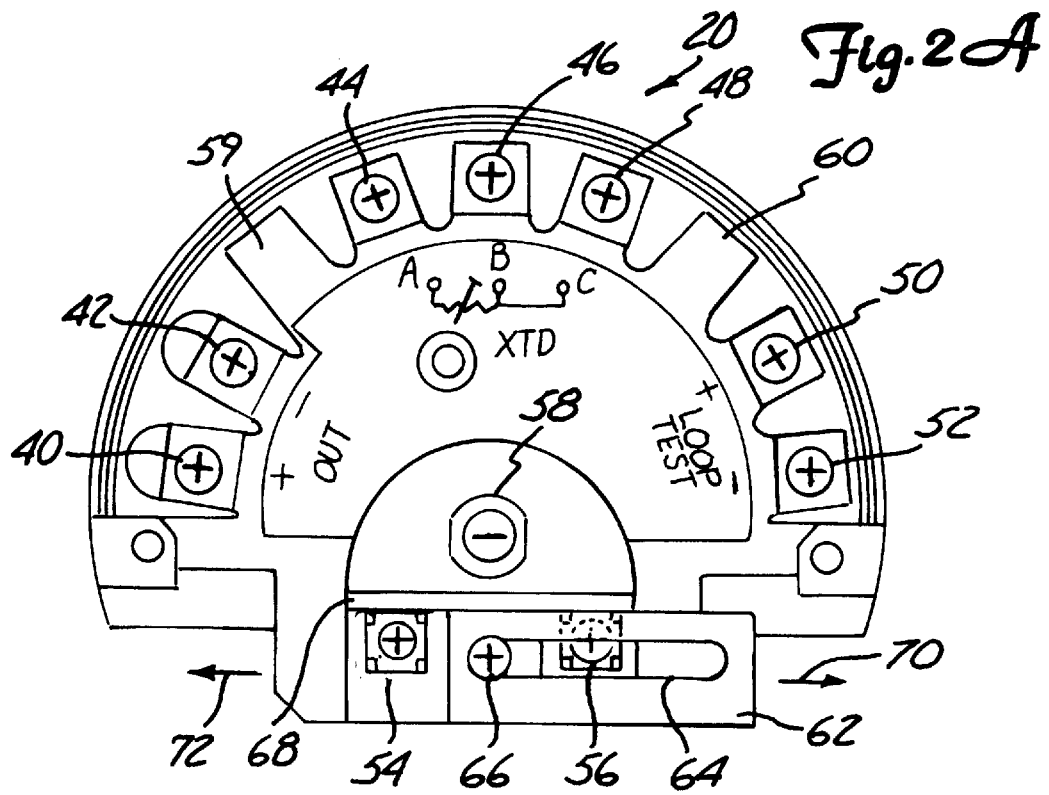
FIG. 2A is a top view of the terminal block shown in FIG. 2 in a first terminal accessing position.
Figure 2B:
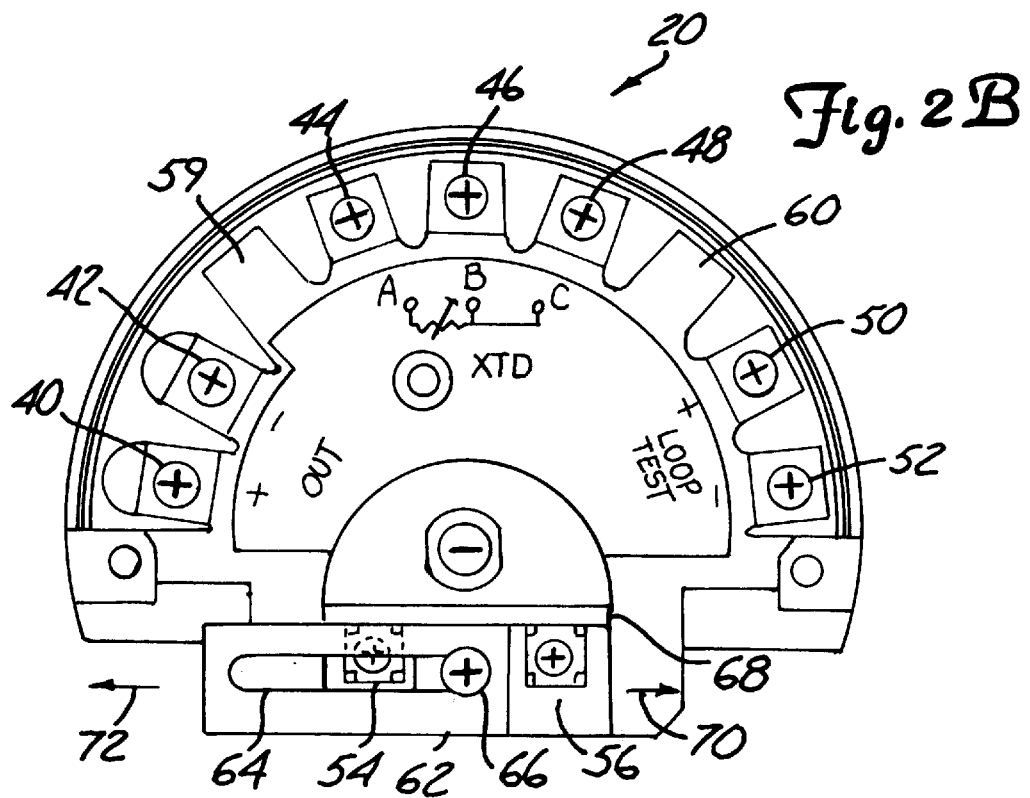
FIG. 2B is a top view of the terminal block shown in FIG. 2 in a second terminal accessing position.
Figure 2:
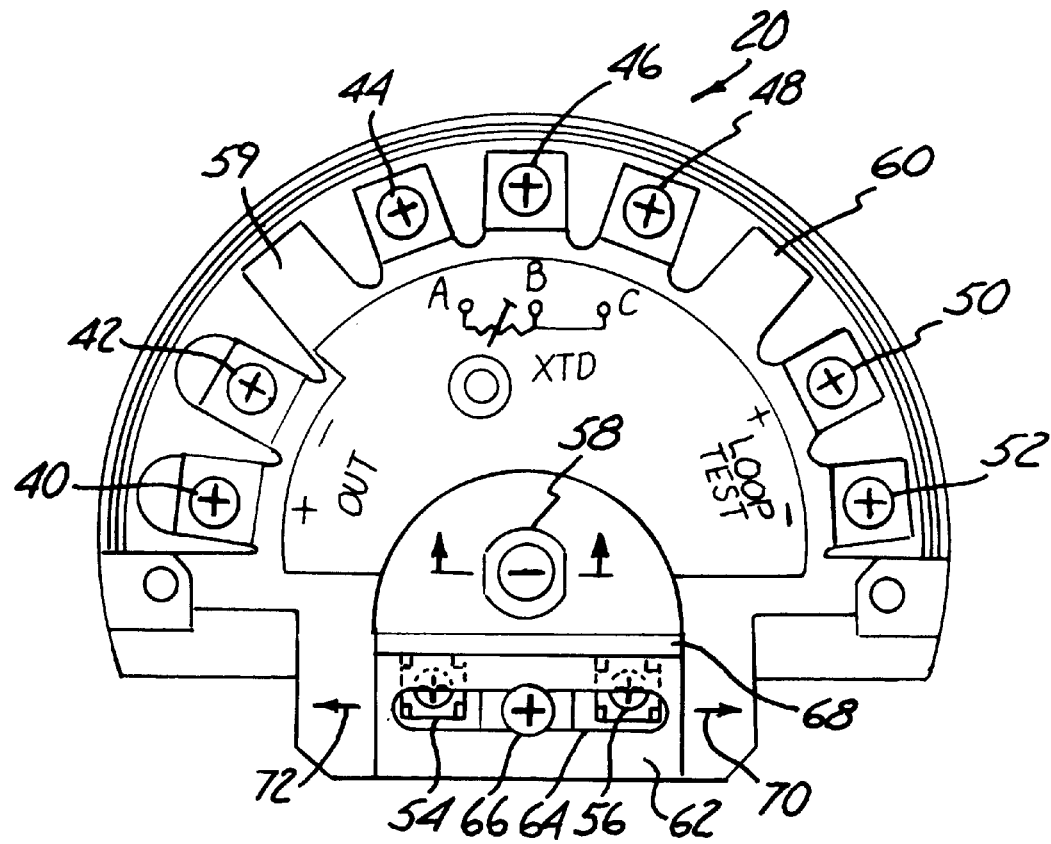
FIG. 2 is a top view of one embodiment of a terminal block in accordance with the present invention.

FIG. 2 is a top view of terminal block 20 in accordance with the present invention. Terminal block 20 includes a plurality of terminal connectors for carrying communication signals, and a plurality of terminal connectors for carrying power. Terminal connectors 40 and 42 are preferably coupled to a communications loop, such as a 4–20 mA process control communications loop which is used to communicate with transmitter 10, and which is used by transmitter 10 to communicate with other items to which it is connected.

In one preferred embodiment, transmitter 10 communicates with other transmitters and controllers according to the HART® communications protocol.

Terminal connectors 44, 46 and 48, in the embodiment shown in FIG. 2, provide signals from a temperature sensor, such as a resistive thermal device, which indicate temperature conditions that may affect the measurement taken by transmitter 10.

Terminal connectors 50 and 52, in the embodiment shown in FIG. 2, are loop test terminals which are connected to provide a test signal indicative of the integrity of the loop to which transmitter 10 is connected.

Terminal connectors 54 and 56, in the embodiment shown in FIG. 2, are power connectors which are connected to a power supply. The power supply is used to power the remainder of transmitter 10, including electronic circuitry on printed circuit boards 18.

Terminal block 20 is also provided with a plurality of spare locations 59 and 60. In the embodiment shown in FIG. 2, spare locations 59 and 60 are left empty. However, spare locations 59 and 60 can be provided with terminal connectors to accommodate the connection of transmitter 10 to additional conductors, as desired.

Terminal block 20 is also provided with a fuse holder 58. Fuse holder 58 is formed substantially integrally with terminal block 20 for holding a fuse in substantially axial relation therewith. Fuse holder 58 is described in greater detail with respect to FIG. 4.

It is not uncommon for transmitters, such as transmitter 10, to be supplied by a 230 volt AC nominal power supply. Therefore, it is desirable to maximize the distance between the power supply connectors and the communication signal connectors in order to reduce the likelihood of the power supply signals interfering with the communication signals. In accordance with one feature of the present invention, all of the terminal connectors associated with communication signals (such as connectors 40, 42, 44, 46, 48, 50, 52, 59 and 60) are arranged in a substantially radial configuration about power supply terminal connectors 54 and 56, and proximate the periphery of terminal block 20. By providing the radial configuration of the communication signal terminal connectors relative to the power supply terminal connectors, the distance between the power supply terminal connectors and each of the communication signal connectors is increased. This reduces the likelihood of interference.

Power supply terminal connectors 54 and 56, in accordance with another feature of the present invention, are covered with a slidable cover 62. Slidable cover 62 includes a slot 64 which runs substantially transversely therethrough. Slot 64 is configured to receive a fastener 66, such as a screw, for insertion therethrough. When screw 66 is tightened, it removably fixes cover 62 to terminal block 20. When screw 66 is loosened, it releases cover 62 from terminal block 20 and allows movement of cover 62 relative to terminal block 20.

Terminal block 20 is also provided with a guiding flange 68 which, in one preferred embodiment, runs substantially the entire length of cover 62. Guiding flange 68 abuts cover 62. Therefore, when screw 66 is loosened, and thereby allows relative movement of cover 62 with respect to terminal block 20, guiding flange 68 constrains movement of cover 62 to a substantially transverse sliding movement in the direction generally indicated by arrows 70 and 72.

FIG. 2 shows cover 62 fastened in a covering position in which both power supply terminal connectors 54 and 56 are substantially covered by cover 62. However, since cover 62 is slidable, it can be slid between one of a plurality of alternate accessing positions in which cover 62 allows access to power supply terminal connectors 54 and 56.

FIG. 2A illustrates terminal block 20 shown in FIG. 2 in which cover 62 is slid in the direction indicated by arrow 70 to a first accessing position. In the first accessing position shown in FIG. 2A, cover 62 still substantially covers power supply terminal connector 56. However, cover 62 allows access to power supply terminal connector 54.

FIG. 2B illustrates terminal block 20 shown in FIGS. 2 and 2A, with cover 62 slid in the direction indicated by arrow 72 to a second accessing position. In the second accessing position, cover 62 still substantially covers the entire power supply terminal connector 54, but allows access to power supply terminal connector 56.

Figure 2C:
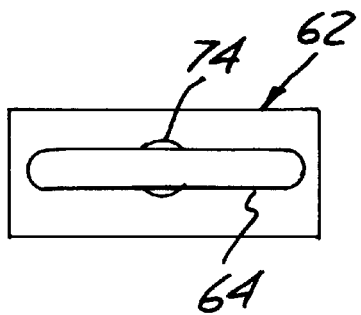
FIG. 2C is an enlarged view of a power supply terminal cover in accordance with the present invention.

FIG. 2C is a greatly enlarged view of cover 62. FIG. 2C illustrates that, not only is cover 62 provided with slot 64, it is also provided with generally circular indentation 74. Indentation 74 is sized to substantially fit the circumference of fastener 66. Therefore, when fastener 66 is tightened, it provides a more secure locking connection between cover 62 and the remainder of terminal block 20.

Thus, cover 62 provides significant advantages over prior power supply connector covers which either pivoted or which slid to expose the power supply terminal connectors. The pivoting or sliding motion of such prior covers required additional space about the perimeter of the terminal block in order to accomplish this movement. In addition, such prior covers either covered both power supply terminal connectors, or exposed both power supply terminal connectors. By contrast, cover 62 in accordance with one feature of the present invention is slidable so that it either covers both of the power supply terminal connectors, or it exposes only one of the power supply terminal connectors at any given time. This reduces the likelihood that the power supply terminal connectors will be short circuited together accidentally and thereby create a spark or some other undesirable affect. In addition, this reduces the external space required about the periphery of terminal bock 20 to accomplish operation of cover 62.

Figure 3:
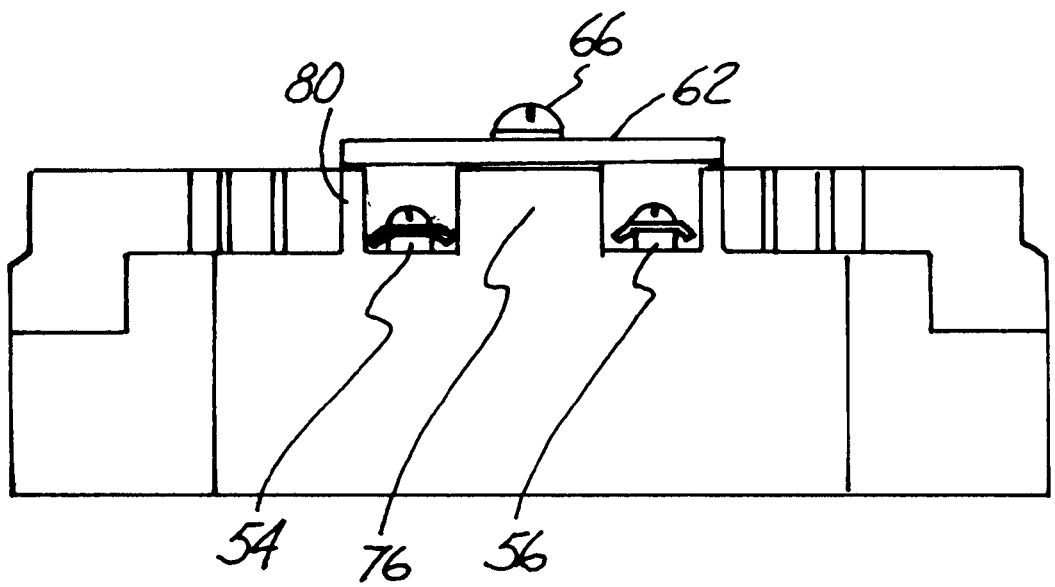
FIG. 3 is a side view of the terminal block shown in FIG. 2.

FIG. 3 is a side view of terminal block 20 shown in FIG. 2. FIG. 3 shows that power supply terminal connectors 54 and 56 are disposed substantially within a cavity defined by center wall member 76 and side wall member 78 and 80. Therefore, even when cover 62 is slid to one of the accessing positions in which either power supply terminal connector 54 or power supply terminal connector 56 is exposed, the walls surrounding the power supply terminal connectors 54 and 56 are high enough to reduce the likelihood that anything undesirable will come into contact with the associated power supply terminal connectors.

Figure 4:
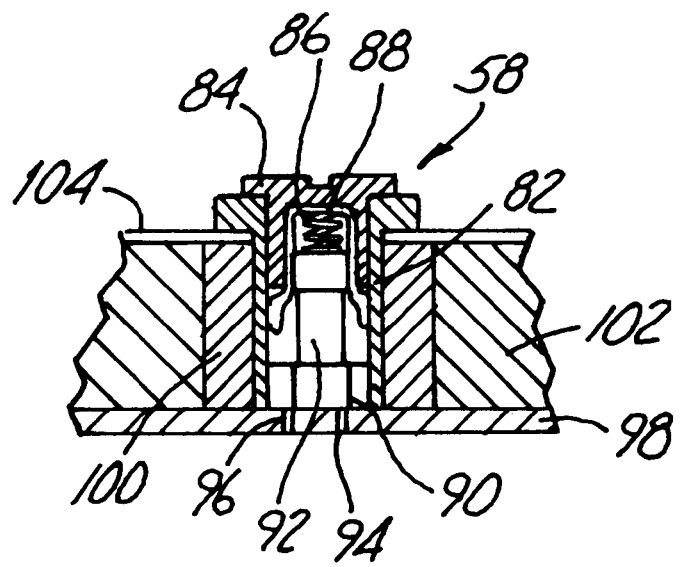
FIG. 4 is a side sectional view of a portion of a terminal block in accordance with the present invention.

FIG. 4 is an enlarged cross-sectional view of fuse holder 58 and a portion of terminal block 20 taken along section lines 4—4 in FIG. 2. Fuse holder 58 is preferably a commercially available fuse holder and includes female portion 82 and male portion 84. Female portion 82 is shown extended through potting shroud 104. Male portion 84 has, in its interior, a spring 86 and a conductive contact element 88. Female portion 82 includes, in its interior, conductive contact portion 90. A fuse 92 is shown disposed within fuse holder 58. Fuse holder 58, in the preferred embodiment, is a suitable fuse holder which includes a plurality of conductive pins 94 and 96 which provide outputs from the fused circuit. In the embodiment shown in FIG. 4, pins 94 and 96 mate with through holes in printed circuit board 98. The signals provided to circuit board 98 by pins 94 and 96 are routed to appropriate circuitry, and eventually to pins 36 shown in FIG. 1.

In addition, in the embodiment shown in FIG. 4, a potting dam 100 is used. Potting dam 100 is preferably formed of Delrin plastic material and is formed into a generally cylindrical member disposed about the exterior periphery of female portion 82 of fuse holder 58. Potting dam 100 serves to substantially isolate fuse holder 58 from potting compound 102 which is injected into the injection molded potting shroud 104.

Injection molded potting shroud 104 is preferably formed of any suitable high temperature plastic. In one preferred embodiment, potting shroud 104 is formed of a material commercially designated as Valox 420 which is manufactured by General Electric.

Therefore, the present invention provides a terminal block in a process control transmitter, which has a variety of advantages. First, the communication signals are arranged radially with respect to the power supply signals. This provides for a greater separation between the communication signal terminal connectors and the power supply terminal connectors than has been provided in prior art terminal blocks. This may significantly reduce the tendency of noise on the power supply to corrupt the communication signals. Also, the generally radial layout of the terminals is easier to service because the connections are easier to distinguish from one another than in prior terminal blocks which simply had one or more rows of connectors.

In addition, the present invention provides an integral fuse holder which is substantially integral with the remainder of the terminal block- Thus, the power supply circuit can be fused without consuming excess space in the transmitter housing. Also, since the fuse is inserted axially into the terminal block, the likelihood that the fuse will be accidentally broken or damaged, or that inserting and removing a fuse will generate a spark, is significantly reduced. Further, since the fuse is generally centrally located and may be the most accessed part of the terminal block or transmitter, service is made easier.

Further, the present invention provides a slidable cover over the power supply terminal connectors. The slidable cover is configured to expose less than all of the power supply terminal connectors and preferably only one of the power supply terminal connectors at any given time. This saves significant space within the transmitter housing and also reduces the likelihood that the power supply terminal connectors will be shorted together.

Although the present invention has been described with reference to preferred embodiments, workers skilled in the art will recognize that changes may be made in form and detail without departing from the spirit and scope of the invention.

What is claimed is:

1. An explosion proof electrical feedthrough assembly in a process variable transmitter having a sensor sensing a process variable and providing a sensor output signal indicative of the sensed process variable and a processing circuit coupled to the sensor to receive the sensor output signal and provide a transmitter output signal based on the sensor output signal, the feedthrough assembly comprising:

a terminal block coupled to the processing circuit and including power supply terminal connectors and communication signal connectors, the communication signal connectors being arranged generally radially to form a generally radial arrangement, and the power supply terminal connectors being disposed in a generally central region of the radial arrangement.

2. The assembly of claim 1 wherein the terminal block has a substantially hemispherical periphery, and wherein the communication signal connectors are arranged in substantially hemispherical relation to the power supply terminal connectors.

3. The assembly of claim 1 and further comprising:

a cover slidably disposed relative to the power supply terminal connectors.

4. The assembly of claim 3 wherein the cover is configured to slide between a covering position in which the cover covers the power supply terminal connectors, and accessing positions in which the cover exposes less than all of the power supply terminal connectors.

5. The assembly of claim 4 wherein the accessing positions comprise:

a first accessing position in which the cover exposes only a first power supply terminal connector; and a second accessing position in which the cover exposes only a second of the power supply terminal connectors.

6. The assembly of claim 1 wherein the terminal block further comprises:

a fuse holder formed integrally with the terminal block and including a fuse receiving cavity defined by the terminal block for receiving the fuse.

7. The assembly of claim 6 wherein the plurality of communication signal connectors are arranged generally radially about the fuse holder.

8. An explosion proof electrical feedthrough assembly in a process variable transmitter having a sensor sensing a process variable and providing a sensor output signal indicative of the sensed process variable and a processing circuit coupled to the sensor to receive the sensor output signal and provide a transmitter output signal based on the sensor output signal, the assembly comprising:

a terminal block coupled to the processing circuit and including a plurality of power supply terminal connectors and communication signal connectors, and further comprising a cover slidably disposed relative to the power supply terminal connectors between a covering position in which the cover covers the power supply terminal connectors, and accessing positions in which the cover exposes only one of the power supply terminal connectors.

9. The assembly of claim 8 wherein the accessing positions comprise:

a first accessing position in which the cover exposes only a first power supply terminal connector; and a second accessing position in which the cover exposes only a second of the power supply terminal connectors.

10. The assembly of claim 8 wherein the communication signal connectors are arranged generally radially about the power supply terminal connectors.

11. The assembly of claim 10 wherein the terminal block has a substantially hemispherical periphery, and wherein the communication signal connectors are arranged in substantially hemispherical relation to the power supply terminal connectors.

12. The assembly of claim 8 wherein the terminal block further comprises:

a fuse holder formed integrally with the terminal block and including a fuse receiving cavity defined by the terminal block for receiving the fuse.

13. The assembly of claim 12 wherein the plurality of communication signal connectors are arranged generally radially about the fuse holder.

14. An explosion proof electrical feedthrough assembly in a process variable transmitter having a sensor sensing a process variable and providing a sensor output signal indicative of the sensed process variable and a processing circuit in a first chamber of the transmitter and coupled to the sensor to receive the sensor output signal and provide a transmitter output signal based on the sensor output signal, the assembly comprising:

a terminal block in a second chamber of the transmitter and coupled through a dividing wall to the processing circuit and including:

a potting shroud defining a cavity therein;

a plurality of power supply terminal connectors and communication signal connectors extending through the potting shroud;

a fuse holder extending through the potting shroud and including a fuse receiving cavity for receiving the fuse and wherein the plurality of communication signal connectors are arranged generally radially about the fuse holder;

a circuit board coupled to the power supply terminal connectors and the communication signal connectors; and potting material disposed about the circuit board and filling the cavity in the potting shroud; and a plurality of feedthrough pins coupling the circuit board to the processing circuit through the dividing wall.

15. The assembly of claim 14 wherein the communication signal connectors are arranged generally radially about the power supply terminal connectors.

16. The assembly of claim 14 wherein the terminal block has a substantially hemispherical periphery, and wherein the communication signal connectors are arranged in substantially hemispherical relation to the power supply terminal connectors.

17. The assembly of claim 14 and further comprising:

a cover slidably disposed relative to the power supply terminal connectors.

18. The assembly of claim 17 wherein the cover is configured to slide between a covering position in which the cover covers the power supply terminal connectors, and accessing positions in which the cover exposes less than all of the power supply terminal connectors.

19. The assembly of claim 18 wherein the accessing positions comprise:

a first accessing position in which the cover exposes only a first power supply terminal connector; and a second accessing position in which the cover exposes only a second of the power supply terminal connectors.

20. An explosion proof electrical feedthrough assembly in a process variable transmitter having a sensor sensing a process variable and providing a sensor output signal indicative of the sensed process variable and a processing circuit coupled to the sensor to receive the sensor output signal and provide a transmitter output signal based on the sensor output signal, the feedthrough assembly comprising:

a terminal block coupled to the processing circuit and including power supply connectors and communication signal connectors, the terminal block having a substantially hemispherical periphery, and wherein the communication signal connectors are arranged in substantially hemispherical relation to the power supply connectors.

21. An explosion proof electrical feedthrough assembly in a process variable transmitter having a sensor sensing a process variable and providing a sensor output signal indicative of the sensed process variable and a processing circuit coupled to the sensor to receive the sensor output signal and provide a transmitter output signal based on the sensor output signal, the feedthrough assembly comprising:

a terminal block coupled to the processing circuit and including communication signal connectors disposed in a generally radial arrangement, power supply terminal connectors, a fuse holder formed integrally with the terminal block to define a fuse receiving cavity, and a removable cap covering the fuse receiving cavity and releasably engaging a fuse disposed therein.

22. An explosion proof electrical feedthrough assembly in a process variable transmitter having a sensor sensing a process variable and providing a sensor output signal indicative of the sensed process variable and a processing circuit coupled to the sensor to receive the sensor output signal and provide a transmitter output signal based on the sensor output signal, the assembly comprising:

a terminal block coupled to the processing circuit and including a plurality of power supply connectors comprising a first voltage potential connector and a second voltage potential connector, and communication signal connectors, and further comprising a cover movably disposed relative to the power supply connectors between a covering position in which the cover covers the power supply connectors, and accessing positions in which the cover exposes only one of the first and second voltage potential connectors.

* * * * *